US011017702B2

(12) United States Patent
Jang

(10) Patent No.: US 11,017,702 B2
(45) Date of Patent: May 25, 2021

(54) DISPLAY DEVICE AND DRIVING METHOD THEREOF

(71) Applicant: SAMSUNG DISPLAY CO., LTD., Yongin-si (KR)

(72) Inventor: Woo Seok Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/715,744

(22) Filed: Dec. 16, 2019

(65) Prior Publication Data

US 2020/0234620 A1 Jul. 23, 2020

(30) Foreign Application Priority Data

Jan. 17, 2019 (KR) ........................ 10-2019-0006281

(51) Int. Cl.

*G09G 3/30* (2006.01)
*G06F 3/038* (2013.01)
*G09G 3/00* (2006.01)

(52) U.S. Cl.

CPC ....... *G09G 3/006* (2013.01); *G09G 2330/021* (2013.01); *G09G 2330/027* (2013.01); *G09G 2330/04* (2013.01); *G09G 2330/12* (2013.01)

(58) Field of Classification Search

CPC .. G09G 3/36; G09G 3/34; G09G 3/32; G09G 3/00; G09G 5/00; G09G 3/30; F21V 7/04; H04M 1/02; G06F 3/038

See application file for complete search history.

(56) References Cited

U.S. PATENT DOCUMENTS

| | | | | |
|---|---|---|---|---|
| 6,809,716 B1 * | 10/2004 | Kim | ........................ G09G 5/005 345/3.2 |
| 2006/0267879 A1 | 11/2006 | Lee | |
| 2011/0169582 A1 * | 7/2011 | Kim | ........................ H03L 7/081 331/1 R |
| 2013/0050176 A1 * | 2/2013 | Kim | ........................ G09G 5/18 345/214 |

(Continued)

FOREIGN PATENT DOCUMENTS

| | | |
|---|---|---|
| JP | 4793013 | 10/2011 |
| KR | 10-2014-0141276 | 12/2014 |

(Continued)

OTHER PUBLICATIONS

Extended European Search Report dated Mar. 4, 2020 in Corresponding European Patent Application No. 20152552.4.

*Primary Examiner* — Pegeman Karimi
(74) *Attorney, Agent, or Firm* — F. Chau & Associates, LLC

(57) ABSTRACT

A display device is provided including a display unit configured to display an image; a processor that supplies a control signal for controlling a driving of the display unit; a detection circuit that detects whether the control signal is abnormal based on a frequency of the control signal measured in a frame unit; and a power supply that supplies driving power to the display unit, where the driving power is blocked from being supplied to the display unit when the control signal is detected to be abnormal. The detection circuit detects whether the control signal is abnormal based on an average frequency of the control signal for N successive frames, where N is a natural number of 2 or more.

24 Claims, 8 Drawing Sheets

(56) References Cited

U.S. PATENT DOCUMENTS

| | | | | |
|---|---|---|---|---|
| 2014/0362292 | A1* | 12/2014 | Lee | H04N 5/04<br>348/547 |
| 2017/0162092 | A1 | 6/2017 | Kim et al. | |
| 2017/0213490 | A1 | 7/2017 | Jeong et al. | |

FOREIGN PATENT DOCUMENTS

| | | |
|---|---|---|
| KR | 10-1554351 | 9/2015 |
| KR | 10-2017-0065060 | 6/2017 |
| KR | 10-2017-0080327 | 7/2017 |
| KR | 10-2017-0088005 | 8/2017 |

* cited by examiner

DISPLAY DEVICE AND DRIVING METHOD THEREOF

CROSS-REFERENCE TO RELATED APPLICATION

This U.S. non-provisional patent application claims priority under 35 USC § 119 to Korean Patent Application No. 10-2019-0006281 filed in the Korean Intellectual Property Office on Jan. 17, 2019, the disclosure of which is incorporated by reference in its entirety herein.

Technical Field

Exemplary embodiments of the inventive concept relates to a display device and a driving method thereof.

Discussion of Related Art

Flat-panel display devices are far lighter and thinner than traditional cathode ray tube television sets. Examples of flat-panel display devices include an organic light emitting diode display device, a liquid crystal display device, and a plasma display device.

A flat-panel display device may include a display panel that includes pixels for displaying an image, a timing controller that generates control signals, and a data driver that supplies a data signal to the pixels and a scan driver that supplies a scan signal to the pixels based on the control signals supplied from the timing controller.

Since the data signal and scan signal supplied to the pixels are generated based on the control signals, when one of the control signals becomes abnormal due to a power supply noise, an abnormality may occur immediately on the display panel.

SUMMARY OF THE INVENTION

At least one exemplary embodiment of the inventive concept provides a display device capable of detecting abnormal control signals and a driving method thereof.

In addition, at least one exemplary embodiment of the inventive concept provides a display device that detects whether a control signal for controlling a driving of a display unit has an abnormality based on an average frequency of the control signal during a plurality of frames and determines the control signal to be abnormal when the abnormality is successively detected a certain number of times, and a driving method thereof.

A display device according to an exemplary embodiment of the inventive concept includes a display unit configured to display an image; a processor that supplies a control signal for controlling a driving of the display unit; a detection circuit that detects whether the control signal is abnormal based on a frequency of the control signal measured in a frame unit; and a power supply that supplies driving power to the display unit, where the driving power is blocked from being supplied to the display unit when the control signal is detected to be abnormal, wherein the detection circuit detects whether the control signal is abnormal based on an average frequency of the control signal for N successive frames, where N is a natural number of 2 or more.

In addition, the detection circuit may calculate the average frequency for a detection period formed of the N successive frames and detects the control signal to be abnormal for the detection period when the average frequency is outside a predetermined threshold range.

In addition, the detection circuit may determine the control signal to be in an abnormal state when the control signal is detected to be abnormal for M successive detection periods, where M is a natural number of 2 or more.

In addition, the threshold range may be set between a first threshold value obtained by subtracting an offset value from a reference value of the frequency and a second threshold value obtained by adding the offset value to the reference value.

In addition, the threshold range may be set to a fixed value or a variable value depending on a driving environment of the display device.

In addition, the offset value may be set based on a maximum allowable variation of the frequency or a variation of the frequency that can occur under a maximum load condition.

In addition, the reference value may be set to vary based on a maximum value or minimum value of the frequency measured before the control signal is detected to be abnormal.

In addition, the detection circuit may output an abnormal detection signal in response when the control signal is detected to be abnormal.

In addition, the detection circuit may output the abnormal detection signal to the processor or the display unit, and the processor or the display unit may disable the power supply in response to the abnormal detection signal.

In addition, the detection circuit may disable the power supply when the control signal is detected to be abnormal.

In addition, wherein the power supply may include a first power supply that converts AC power supplied from an external source into DC power and outputs the DC power; and a second power supply that generates the driving power from the DC power output from the first power supply and supplies the driving power to the display unit, wherein at least one of the first power supply and the second power supply is disabled when the control signal is detected to be abnormal.

A driving method of a display device according to an exemplary embodiment of the inventive concept includes a power supply supplying driving power to a display unit for displaying an image; a detection circuit measuring a frequency of a control signal in a frame unit, the control signal for controlling a driving of the display unit; the detection circuit calculating an average frequency of the control signal for a detection period formed of N successive frames, where N is a natural number of 2 or more; the detection circuit detecting whether the control signal is abnormal based on the average frequency; and blocking the supply of the driving power to the display unit when the control signal is detected to be abnormal.

In addition, the detecting whether the control signal is abnormal may include determining whether the average frequency is within a predetermined threshold range; and detecting the control signal to be abnormal for the detection period when the average frequency is outside a threshold range.

In addition, the determining whether the control signal is abnormal may further include determining the control signal to be in an abnormal state when the control signal is detected to be abnormal for M successive detection periods, where M is a natural number of 2 or more.

In addition, the driving method may further include setting the threshold range before the detecting whether the control signal is abnormal.

In addition, the setting the threshold range may include calculating a first threshold value obtained by subtracting an offset value from a reference value of the frequency and a second threshold value obtained by adding the offset value to the reference value; and setting the threshold range between the first threshold value and the second threshold value.

In addition, the setting the threshold range may include changing at least one of the reference value and the offset value corresponding to a driving environment of the display device; and resetting the threshold range based on at least one of the changed reference value and the changed offset value.

In addition, the offset value may be set based on a maximum allowable variation of the frequency or a variation of the frequency that can occur under a maximum load condition.

In addition, the changing at least one of the reference value and the offset value may include varying the reference value based on a maximum value or minimum value of the frequency measured before the control signal is detected to be abnormal.

In addition, the driving method may further include outputting an abnormal detection signal after the detecting detects the control signal is abnormal.

In addition, the blocking of the supply of the driving power to the display unit may include disabling at least one of a first power supply and a second power supply, and wherein the first power supply converts an AC power supplied from an external source into a DC power and outputs the DC power, and the second power supply generates the driving power from the DC power output from the first power supply and supplies the driving power to the display unit.

A display device according to an exemplary embodiment of the inventive concept includes a display panel that includes at least one pixel and displays an image; a timing controller that supplies a driving control signal for controlling a driving of the display panel; a detection circuit that detects whether the driving control signal is abnormal based on a frequency of the driving control signal measured in a frame unit; and a power supply that supplies driving power to the display panel, where the driving power is blocked from being supplied to the display panel when the driving control signal is detected to be abnormal, wherein the detection circuit detects whether the driving control signal is abnormal based on an average frequency of the control signal for N successive frames, where N is a natural number of 2 or more.

In addition, the detection circuit may calculate the average frequency for a detection period formed of the N successive frames and detect the driving control signal to be abnormal for the detection period when the average frequency is outside a predetermined threshold range.

In addition, the detection circuit may determine the driving control signal to be in an abnormal state when the driving control signal is detected to be abnormal for M successive detection periods, where M is a natural number of 2 or more.

A display device and a driving method thereof according to an exemplary embodiment of the inventive concept detects whether a control signal has an abnormality based on an average frequency of the control signal for a plurality of frames and finally determines the control signal to be abnormal when the abnormality is successively detected a certain number of times, thereby improving reliability of detecting an abnormal control signal.

In addition, a display device and a driving method thereof according to an exemplary embodiment of the inventive concept can block the driving power supplied to the display panel when an abnormal control signal is detected due to power source noise or the like so that the display panel can be stably driven and so that perception of image errors can be prevented.

According to an exemplary embodiment of the inventive concept, the display device includes pixels coupled to scan lines and data lines, first through nth scan drivers configured to supply scan signals to the pixels through the scan lines, a data driver configured to supply data signals and a bias signal to the pixels through the data lines, and a timing controller configured to supply image data and bias data to the data driver, and to sequentially supply first through nth start signals to the first through nth scan drivers, respectively. In an exemplary embodiment, the pixels are supplied with the data signals when the scan signals are supplied during display periods, and are supplied with the bias signal when the scan signals are supplied during a bias period between the display periods, where n is a natural number greater than one.

BRIEF DESCRIPTION OF THE DRAWINGS

The inventive concept will be more clearly understood by describing in detail exemplary embodiments thereof with reference to the accompanying drawings.

DETAILED DESCRIPTION OF THE EXEMPLARY EMBODIMENTS

Figure 1:
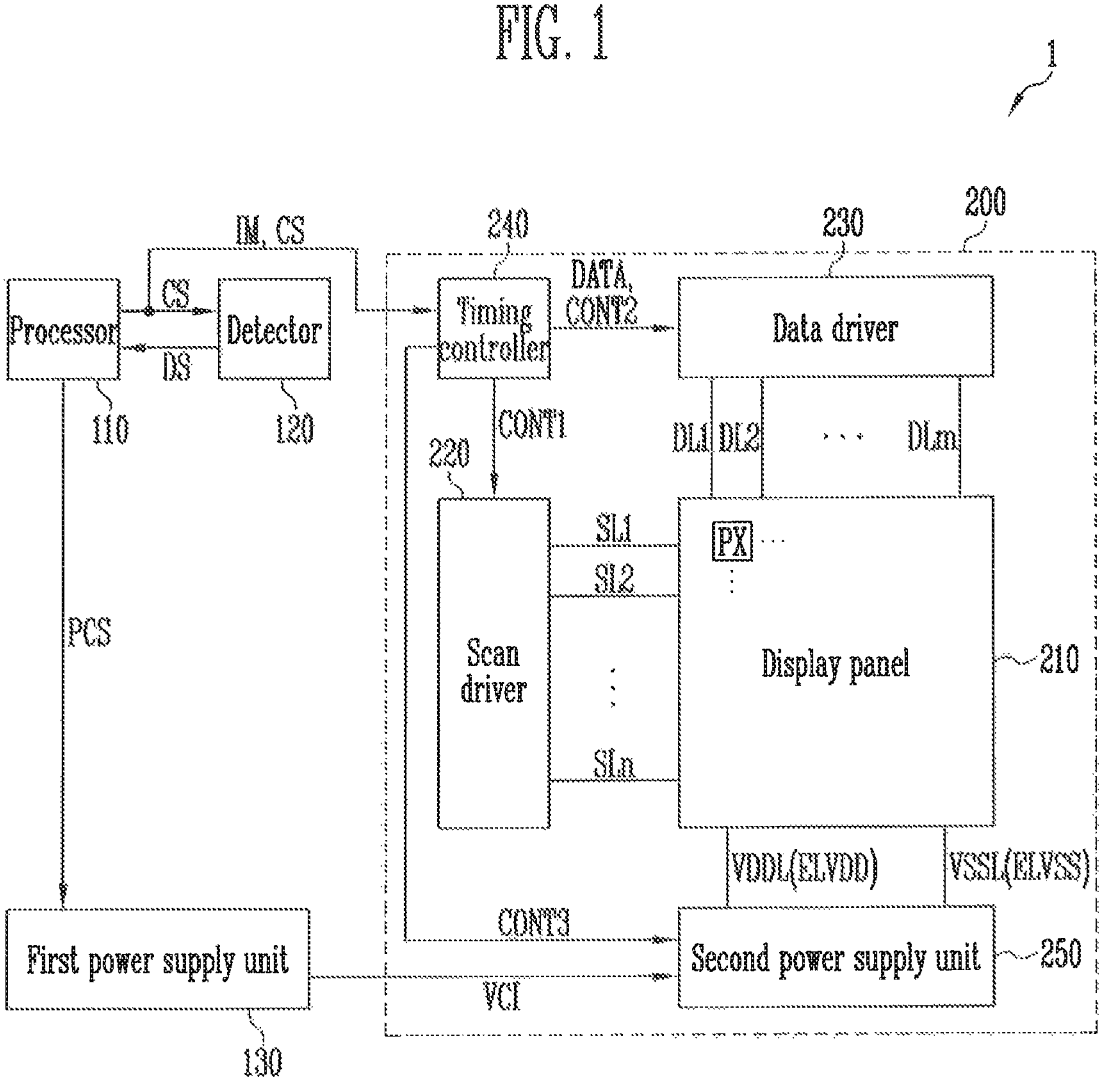
FIG. 1 is a block diagram for showing a display device according to an exemplary embodiment of the inventive concept.

Exemplary embodiments of the inventive concept provide a display device capable of determining whether one of its control signals for controlling its display panel is abnormal, and a driving method of the display device. Once the display device determines that one of its control signals is abnormal, the display device may perform an action to prevent the abnormal control signal from generating visually perceptible image errors. For example, when the control signal is detected to be abnormal due to noise of a power supply used to generate the control signal, the display device can block power from being supplied to the display device for generating the control signal.

In the entire specification, when an element is referred to as being "connected" or "coupled" to another element, it can be directly connected or coupled to the another element or be indirectly connected or coupled to the another element with one or more intervening elements interposed therebetween. It will also be understood that when an element is referred to as being "between" two elements, it can be the only element between the two elements, or one or more intervening elements may also be present.

Exemplary embodiments of the inventive concept will be described more fully hereinafter with reference to the accompanying drawings. Like reference numerals may refer to like elements throughout this application.

Figure 2:
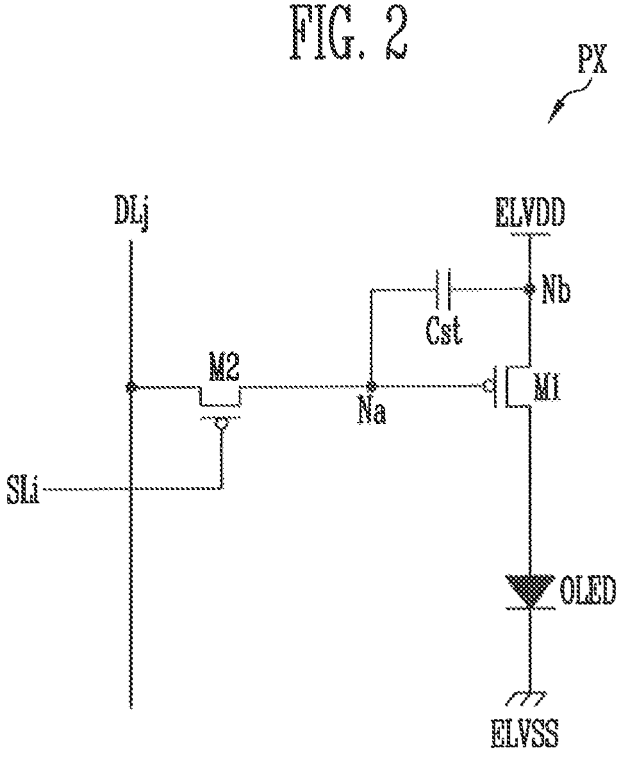
FIG. 2 is a circuit diagram for showing an example of a pixel included in the display device of FIG. 1.

FIG. 1 is a block diagram for showing a display device according to an exemplary embodiment of the inventive concept, and FIG. 2 is a circuit diagram for showing an example of a pixel included in the display device of FIG. 1.

Referring to FIG. 1, a display device 1 (e.g., a display system) according to an exemplary embodiment of the inventive concept includes a processor 110, detector 120 (e.g., a detection circuit), a first power supply unit 130 (e.g., a power supply, voltage generator, battery, etc.) and display unit 200 (e.g., a display device).

The processor 110 may transmit an image signal IM and a control signal CS to the timing controller 240. Here, the control signal CS may include at least one of a vertical synchronization signal, a horizontal synchronization signal, a data enable signal, and a clock signal. The vertical synchronization signal may be used to indicate when a new frame of image data derived from the image signal IM is to be output. The horizontal synchronization signal may indicate when a new row of image data of the frame is to be output. The data enable signal may indicate when the image data is valid. The processor 110 may be implemented as an integrated circuit (IC), an application processor (AP), a mobile AP, but is not limited thereto.

In an exemplary embodiment of the inventive concept, the processor 110 controls the first power supply unit 130 in response to an abnormal detection signal DS received from the detector 120. Specifically, the processor 110 can block the first supply unit 130 from supplying power to the display unit 200 when an abnormal state of the control signal CS is indicated by the abnormal detection signal DS. For example, the processor 110 can block the first supply unit 130 from supplying power by disabling the first power supply unit 130. In another embodiment, the processor 100 restarts the first supply unit 130 when the abnormal detection signal DS indicates the abnormal state. The restart may include powering the first supply unit 130 off and then on.

In an exemplary embodiment of the inventive concept, the abnormal detection signal DS is transmitted to processor 110 when the control signal CS is determined to be abnormal. A flag value of the abnormal detection signal DS may be set to 1 when the control signal CS is determined to be abnormal, and the flag value of the abnormal detection signal DS may be set to 0 when the control signal CS is determined to be normal. In an exemplary embodiment of the inventive concept, the abnormal detection signal DS is transmitted to the processor 110 in a frame cycle to determine whether the control signal CS is abnormal. For example, the frame cycle may be a period during which a frame of image data is output to the display panel 210.

The processor 110 may disable the first power supply unit 130 by supplying a power control signal PCS to the first power supply unit 130. The power control signal PCS may be a power supply disable signal (PW_SUPPLY_DISABLE) or a power protection enable signal (PW_PROTECTION_EN).

In an exemplary embodiment, the detector 120 measures a frequency of the control signal CS output from the processor 110 and compares the measured frequency with a threshold range to detect whether the control signal CS is abnormal. For example, when an output voltage VCI supplied from the first power supply unit 130 to the display unit 200 acts as noise on the control signal CS, a signal characteristic of the control signal CS (e.g., a frequency may change abnormally). For example, when the output voltage VCI has noise, this noise may produce interference that causes the control signal CS to become abnormal. This noise may occur when the power supplied to the display unit 200 rises abnormally. For example, when the power supply unit 130 malfunctions, it may be switch from supplying a first supply voltage to supplying a second higher supply voltage too quickly, thereby producing noise. In an exemplary embodiment, the detector 120 periodically measures the frequency of the control signal CS and detects an abnormality of the control signal CS depending on whether the frequency is out of a predetermined threshold range. In this exemplary embodiment of the inventive concept, the detector 120 may measure the frequency of the control signal CS at every frame cycle. For example, the detector 120 may perform the measurement each time a new frame of image data has been output to the display panel 210.

In an exemplary embodiment of the inventive concept, the detector 120 calculates an average frequency of the control signal CS for a plurality (e.g., N, where N is a natural number of 2 or more) of frames or frame periods (hereinafter, a detection period), and compares the calculated average frequency with a threshold range to detect an abnormality of the control signal CS. A frame period may be a period during which a new frame of image data is output to the display pane 210. For example, when N is 2, the detector 120 measures a first frequency of the control signal CS during a first frame period, measures a second frequency of the control signal during a second frame period, and calculates an average frequency by adding the first and second frequencies to generate a sum and dividing the sum by two. In addition, the detector 120 may determine that the control signal CS is abnormal when the abnormality of the control signal CS is continuously detected more than a predetermined threshold number (e.g., M times, where M is a natural number of 2 or more) according to the method described above. That is, the detector 120 may determine that the control signal CS is abnormal when an abnormality of the control signal CS is detected for M successive detection periods. For example, when M is 2, even though the first detected frequency is outside a certain range, the detector 120 does not conclude the control signal CS is abnormal until the second detected frequency is also outside the range.

In an exemplary embodiment of the inventive concept, the threshold range is set to a fixed value. For example, the threshold range may be set to a fixed value based on a reference value and the maximum allowable variation of a frequency of the control signal CS for the display device 1 or a variation of the control signal CS that may occur under a maximum load condition of the display device 1.

In an exemplary embodiment of the inventive concept, the threshold range is set to a variable value. For example, the threshold range may be varied based on the frequency measured by the detector 120 while the display apparatus 1 is driven after the threshold range is set as described above. In this exemplary embodiment of the inventive concept, the threshold range may be reset based on the maximum value and/or minimum value of the frequency measured before the control signal CS is detected to be abnormal during arbitrary detection period. At this time, the threshold range may be reset to a value that applies an arbitrary offset value to the maximum value and/or the minimum value of the measured frequency.

A method of detecting an abnormal control signal CS using the detector 120 will be described in more detail below. In the following exemplary embodiments, the detector 120 is described as determining an abnormality (e.g., an abnormal control signal CS) based on the frequency of the control signal CS, but the technical idea of the inventive concept is not limited thereto. In another exemplary embodiment of the inventive concept, the detector 120 may determine the abnormality of the control signal CS based on the amplitude, period, or peak to peak voltage of the control signal CS.

If the control signal CS is determined to be abnormal, the detector 120 may transmit an abnormal detection signal DS to the processor 110 to inform of an abnormal state of the control signal CS.

While the detector 120 is shown as being provided outside the display unit 200 in FIG. 1, the technical idea of the inventive concept is not limited thereto. That is, in exemplary embodiments of the inventive concept, the detector 120 may be provided within the display unit 200 or may be provided integrally with the timing controller 240 in the display unit 200.

In an exemplary embodiment, the first power supply unit 130 converts alternating current (AC) power supplied from an external power source into direct current (DC) power and supplies the DC power to the display unit 200. For example, the first power supply unit 130 may be a switching mode power supply (SMPS) device using a switching type to convert AC power to DC power.

In an exemplary embodiment of the inventive concept, the first power supply unit 130 is disabled by the processor 110 when the abnormality of the control signal CS is detected by the detector 120. In an exemplary embodiment, when the control signal CS is detected to be normal by the detector 120, if the first power supply unit 130 has already been disabled, the first power supply unit 130 is enabled. In an exemplary embodiment of the inventive concept, the first power supply unit 130 is reset by the processor 110 when the abnormality of the control signal CS is detected by the detector 120.

The display unit 200 includes a display panel 210, a scan driver 220 (e.g., a scan driving circuit or a gate driving circuit), a data driver 230 (e.g., a data driving circuit or a source driving circuit), a timing controller 240 (e.g., a timing control circuit), and a second power supply unit 250 (e.g., a power supply, a voltage generator, or a battery). The data driver 230 may provide data signals and a bias signal to the pixels of the display panel 210 through data lines. The timing controller 240 may be configured to supply image data and bias data to the data driver 230, and to sequentially supply first through nth start signals to first through nth scan driving units of the scan driver 220, respectively. In an exemplary embodiment, the pixels are supplied with the data signals when scan signals are supplied during display periods, and are supplied with the bias signal when the scan signals are supplied during a bias period between the display periods, where n is a natural number greater than one.

The display panel 210 is configured to display an image. The display panel 210 includes a plurality of scan lines SL1 to SLn (or gate lines), a plurality of data lines DL1 to DLm (or source lines), and a plurality of pixels PX connected to both the plurality of scan lines SL1 to SLn and the plurality of data lines DL1 to DLm. For example, the pixels PX may be disposed in a matrix form.

FIG. 2 shows an example of the pixel PX connected to the i-th scan line SLi and the j-th data line DLj. The pixel PX may include a driving transistor M1, a switching transistor M2, and a storage capacitor Cst and a light emitting element OLED. For example, the light emitting element OLED may be implemented by an organic light emitting diode.

The driving transistor M1 may include a first electrode connected to a first driving power supply ELVDD, a second electrode connected to the light emitting element OLED, and a gate electrode connected to a first node Na. The driving transistor M1 may control an amount of current flowing in the light emitting element (OLED) corresponding to a voltage value between the gate electrode and a source electrode.

The switching transistor M2 may include a first electrode connected to the j-th data line DLj, a gate electrode connected to the i-th scan line SLi and a second electrode connected to the first node Na. The switching transistor M2 may be turned on when a scan signal is supplied from the i-th scan line SLi to supply a data signal received from the j-th data line DLj to the storage capacitor Cst or may control a potential of the first node Na. At this time, the storage capacitor Cst including the first electrode connected to the first node Na and the second electrode connected to the second node Nb may charge a voltage corresponding to the data signal.

A light emitting element OLED may include a first electrode connected to the second electrode of the driving transistor M1 and a second electrode connected to a second driving power supply ELVSS. The light emitting element OLED may generate light corresponding to an amount of current supplied from the driving transistor M1.

The first electrode of transistors M1 and M2 may be set to either the source electrode or the drain electrode, and the second electrode of transistors M1 and M2 may be set to an electrode different from the first electrode in FIG. 2. For example, if the first electrode is set to the source electrode, the second electrode may be set to the drain electrode.

While the transistors M1 and M2 are illustrated in FIG. 2 as P-channel metal oxide semiconductor (PMOS) transistors, the technical idea of the inventive concept is not limited thereto. For example, the transistors M1 and M2 may instead be implemented as N-channel metal oxide semiconductor (NMOS) transistors. In this exemplary embodiment of the inventive concept, a circuit of the pixel PX may be variously modified to be suitable for driving NMOS transistors.

The scan driver 220 may simultaneously or sequentially apply the scan signals to the scan lines SL1 to SLn of the display panel 210 based on a first driving control signal CONT1 provided from the timing controller 240. In an exemplary embodiment, the scan driver 220 may include at least one of a shift register, a level shifter, and an output buffer.

The data driver 230 may convert the output image signal DATA to an analog type of data voltage based on a second driving control signal CONT2 provided from the timing controller 240 and apply the data voltages to the data lines DL1 to DLm. In an exemplary embodiment, the data driver 230 includes a gamma block (e.g., circuit) that generates a plurality of gamma voltages and a data driving block (e.g., circuit) that generates a data voltage based on the gamma voltages. The data driving block may include a shift register, a latch block (e.g., on or more latch circuits), a digital-analog converter (DAC), and an output buffer. In an exemplary embodiment, the data driving voltage may be provided to the output buffer and control an output operation timing of the data driver 230.

The timing controller 240 may receive an image signal IM and a control signal CS from the processor 110. The timing controller 240 generates a digital output image signal DATA in accordance with an operating condition of the display panel 210 based on the image signal IM and provides a digital type of the output image signal DATA to the data driver 230.

In addition, the timing controller 240 may generate the first driving control signal CONT1 for controlling a driving timing of the scan driver 220 based on the control signal CS, and the second driving control signal CONT2 for controlling a driving timing of the data driver 230. The timing controller 240 may provide the first driving control signal CONT1 and the second driving control signal CONT2 to the scan driver 220 and the data driver 230, respectively. In an exemplary embodiment, the timing controller 240 supplies a power driving control signal CONT3 for controlling a driving timing of the second power supply unit 250 to the second power supply unit 250 based on the control signal CS.

The second power supply unit 250 may supply driving power to each pixel PX of the display panel 210. The second power supply unit 250 may supply the first driving power supply ELVDD through a first power line VDDL and the second driving power supply ELVSS through a second power line VSSL. The first driving power supply ELVDD may be set to a high potential voltage, and the second driving power supply ELVSS may be set to a low potential voltage. In an exemplary embodiment, the second power supply unit 250 includes a DC-DC converter that generates the high potential voltage and the low potential voltage from the DC power transmitted from the first power supply unit 130.

The processor 110 provided outside the display unit 200 is described as disabling the first power supply unit 130 when the abnormal control signal CS is detected in FIG. 1, but the technical idea of the inventive concept is not limited thereto. That is, in an exemplary embodiment, the processor 110 disables the second power supply unit 250 when the abnormal control signal CS is detected.

In an exemplary embodiment of the inventive concept, the timing controller 240 disables the second power supply unit 250 when the abnormal detection signal DS received from the detector 120 indicates a control signal CS is abnormal. In an exemplary embodiment, the timing controller 240 enables the second power supply unit 250 if its already been disabled and the abnormal detection signal DS indicates the control signal CS is normal. This exemplary embodiment will be described in more detail with reference to FIG. 8.

In an exemplary embodiment of the inventive concept, the detector 120 is configured to disable the first power supply unit 130 or the second power supply unit 150 upon determining that a control signal CS is abnormal. In an exemplary embodiment, if one of the power supply units has already been disabled and the control signal is determined to be normal, the disabled power supply unit is enabled. This exemplary embodiment will be described in more detail with reference to FIG. 9.

Figure 3:
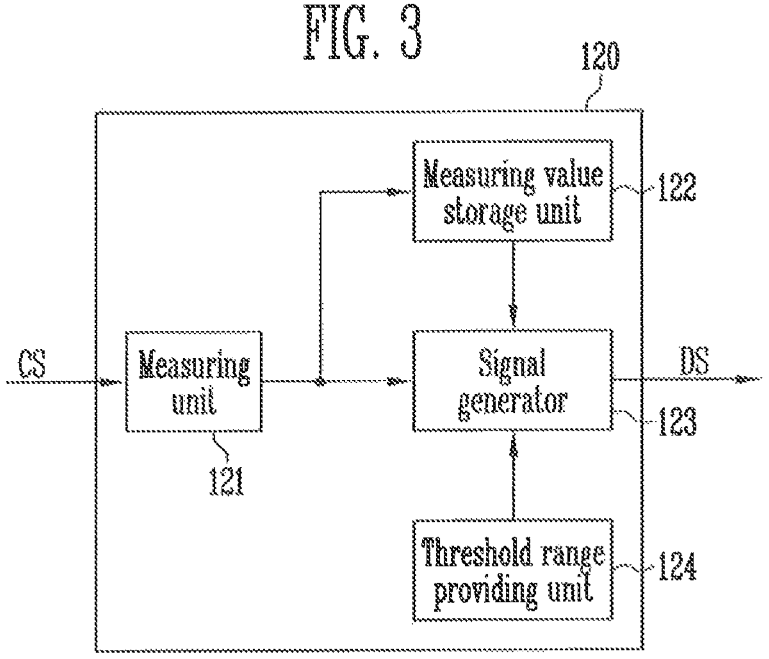
FIG. 3 is a block diagram for showing an example of a detector shown in FIG. 1 according to an exemplary embodiment of the inventive concept.

FIG. 3 is a block diagram for showing an example of the detector shown in FIG. 1 according to an exemplary embodiment of the inventive concept.

Referring to FIG. 3, the detector 120 includes a measuring unit 121, a measuring value storage unit 122, a signal generator 123, and a threshold range providing unit 124.

The measuring unit 121 measures a signal characteristic of the control signal CS received from the processor 110. The signal characteristic may be a frequency of the control signal CS. For example, the measuring unit 121 could be implemented using a frequency measuring circuit.

In an exemplary embodiment of the inventive concept, the measuring unit 121 measures the frequency of the control signal CS in a frame unit based on a vertical synchronization signal included in the control signal CS. For example, if the vertical synchronization signal includes a plurality of pulses, then the frequency of the control signal CS could be measured during a frame period occurring between a rising edge of a first one of the pulses and a rising edge of a second one of the pulses. Here, the control signal CS measured by the measuring unit 121 may include at least one of a clock signal, a vertical synchronization signal, and a horizontal synchronization signal. In an exemplary embodiment, the measuring unit 121 measures the frequency of the control signal CS in one or more row unit(s) based on a horizontal synchronization signal included in the control signal CS. For example, if the horizontal synchronization signal includes a plurality of pulses, then the frequency of the control signal CS could be measured each time a certain number of the pulses elapse.

In an exemplary embodiment, the measuring unit 121 measures the frequency of the control signal CS during an emitting period within one frame period. If the abnormality of the control signal CS occurs within the emitting period, a wrong image may be displayed since the image is displayed on the display unit 200 during the emitting period. Therefore, the detection of the abnormality of the control signal CS during the emitting period may be important to prevent visually perceived image errors, and the frequency detection and the determination of abnormality of the control signal CS according to an exemplary embodiment of the inventive concept may be performed during the emitting period The measuring value storage unit 122 may store a measuring value from the measuring unit 121 to calculate an average measuring value of the control signal CS for a plurality of frames or frame periods. In an exemplary embodiment, the measuring value storage unit 122 may include a dynamic random access memory (DRAM), a static random access memory (SRAM), or the like as a volatile memory device. In another exemplary embodiment, the measuring value storage unit 122 may include a flash memory, an erasable programmable read-only memory (EPROM), an electrically erasable programmable read-only memory (EEPROM) Memory), a phase change random access memory (PRAM), and the like as a nonvolatile memory device. Thus, the measuring value storage unit 122 may be implemented by a volatile or a nonvolatile memory device.

The signal generator 123 may calculate the average measuring values for N successive frames (or frame periods) stored in the measuring value storage unit 122, i.e., a detection period. The signal generator 123 may compare the average measuring value for N successive frames with the threshold range provided by the threshold range providing unit 124 to detect the abnormality of the control signal CS for the corresponding detection period. For example, the signal generator 123 may determine that the control signal CS is abnormal for the detection period when the average frequency of the control signal CS for the N frames is outside the threshold range. For example, if the threshold range is between 1 to 2 megahertz, then the control signal CS would be considered abnormal if its average frequency is less than 1 megahertz or greater than 1 megahertz. In an embodiment, the threshold range providing unit 124 is implemented by a volatile or a nonvolatile memory device, and the signal generator 123 is capable of retrieving the threshold range therefrom as needed. The threshold range providing unit 124 may also be omitted. When the threshold range providing unit 124 is omitted, the threshold range may be stored in the measuring value storage unit 122.

In an exemplary embodiment of the inventive concept, the signal generator 123 determines the control signal CS to be abnormal if an abnormality of the control signal CS is detected for consecutive M detection periods. That is, the signal generator 123 may check whether an abnormal control signal CS is continuously detected during M successive detection periods, thereby preventing an error of determining an abnormal control signal CS due to an instantaneous frequency variation.

In general, when M has a relatively large value, reliability of determining of the abnormal control signal CS is high, but the risk of accident may increase due to a delay in stopping power supply. On the other hand, when M has a relatively small value, the risk of an accident may decrease, but possibility of an error of determining the abnormal control signal CS may increase due to an instantaneous frequency variation caused by a driving environment. Therefore, M may be appropriately selected according to a design characteristic and driving environment of the display device 1. Accordingly, there is no particular limitation on the value of M.

The signal generator 123 may generate and output an abnormal detection signal DS indicating the abnormality of the control signal CS. In an exemplary embodiment, the signal generator 123 may generate and output an abnormal detection signal DS when the control signal CS is determined to be abnormal. In another exemplary embodiment, the signal generator 123 may set a flag value of the abnormal detection signal DS to 1 in response to abnormal determination of the control signal CS, and set the flag value of the abnormal detection signal DS to 0 in response to normal determination of the control signal CS. In this exemplary embodiment, the signal generator 123 may output the abnormal detection signal DS in a frame cycle in which an abnormal determination of the control signal CS is performed.

In an exemplary embodiment of the inventive concept, the signal generator 123 outputs the generated abnormal detection signal DS to the processor 110. In an exemplary embodiment of the inventive concept, the signal generator 123 outputs the generated abnormal detection signal DS to the timing controller 240 of the display unit 200. This exemplary embodiment will be described below in more detail with reference to FIG. 8. In an exemplary embodiment of the inventive concept, the signal generator 123 directly transmits a power control signal PCS based on the abnormal detection signal DS to the first power supply unit 130 or the second power supply unit 250 to block the power provided by the first power supply unit 130 or the second power supply unit 250. This exemplary embodiment will be described below in more detail with reference to FIG. 9.

The threshold range providing unit 124 may provide the threshold range to the signal generator 123. The threshold range may be determined from a range between a first threshold value that subtracts an offset value from a reference value and a second threshold value that adds the offset value to the reference value. Here, the offset value may be set to the same parameter as the reference value or a ratio to the reference value. For example, the upper bound of the threshold range may be the offset value added to the reference value and the lower bound of the threshold range be a result of subtracting the offset value from the reference value.

More specifically, when the offset value is set to the same parameter as the reference value, the threshold range may be set to a range between (reference value−offset value) and (reference value+offset value). In an exemplary embodiment, when the offset value is set to the ratio to the reference value, the threshold range may be set to a range between (reference value×(1−offset value)) and (reference value×(1+offset value).

However, the threshold range is not limited to the above-described exemplary embodiments, and may be variously set according to the design characteristics and the driving environment of the display device 1.

In an exemplary embodiment, the threshold range is set to a fixed value. Alternatively, in another exemplary embodiment where at least one of the reference value and the offset values is variable, the threshold range is set to a variable value.

The reference value may be determined as a fixed value corresponding to the frequency of the control signal CS according to a normal operation of the display device 1, and may be set to, for example, 60 Hz. In an exemplary embodiment, the reference value may be determined to be a variable value, and in this exemplary embodiment, the reference value may be reset based on the maximum value and/or the minimum value of the frequency measured before the abnormality is detected when the control signal CS is detected to be abnormal during arbitrary detection period.

The offset value may be set corresponding to the maximum allowable variation of a frequency of the control signal CS frequency for the display device 1, or a variation of the control signal CS that may occur under the maximum load condition of the display device 1.

In an exemplary embodiment, the threshold range providing unit 124 sets the threshold range to at least one of the fixed value or the variable value according to the driving environment of the display device 1. For example, when a temperature of the display panel 210 increases as the external temperature becomes higher or the driving time becomes longer, the frequency of the control signal CS may increase and have a larger error range. Thus, the threshold range providing unit 124 may vary the threshold range based on the temperature of the display panel 210 or an external temperature measured in the display device 1. The threshold range providing unit 124 may also vary the threshold range based on the degree of degradation of the pixels PX.

Hereinafter, a driving method of the display device 1 including the detector 120 shown in FIG. 3 will be described in more detail.

Figure 4:
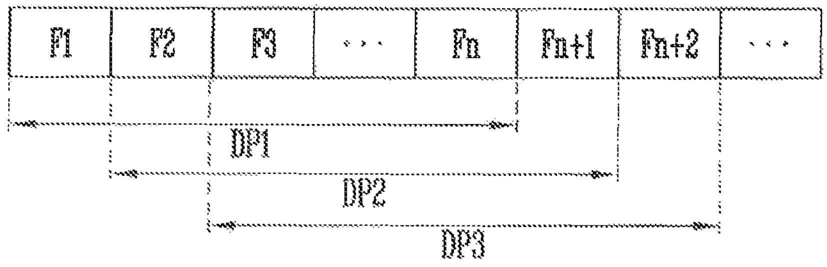
FIG. 4 is a drawing for showing an example of a method of detecting an abnormal control signal by the display device of FIG. 1 according to an exemplary embodiment of the inventive concept.

FIG. 4 is a drawing for showing an example of a method of detecting an abnormal control signal by the display device of FIG. 1.

In exemplary embodiments of the inventive concept, the detector 120 may calculate the average frequency of the control signal CS for N successive frames, i.e., detection periods, from the frequency of the control signal CS of each frame (or frame period) stored in the measuring value storage unit 122.

As shown in FIG. 4, when the frequency of the control signal CS measured for each of the first frame F1 to the N-th frame Fn is stored, then the detector 120 calculates a first average frequency for a first detection period DP1 using frequencies of the control signal CS measured for each of the first frame F1 to the N-th frame Fn. The detector 120 may determine whether the control signal CS for the first detection period DP1 is abnormal by comparing the first average frequency with the threshold range.

In addition, the detector 120 calculates the average frequency for the second detection period DP2 using the frequencies of the control signal CS measured for each of the second frame F2 to the N+1-th frame Fn+1. The detector 120 may determine whether the control signal CS for the second detection period DP2 is abnormal by comparing the second average frequency with the threshold range.

The detector 120 may detect an abnormality of the control signal CS for each detection period DP formed of N frames by repeating the operation of FIG. 4.

In an exemplary embodiment of the inventive concept, when an abnormality of the control signal CS is detected for an arbitrary detection period, the power supply to either the first power supply unit 130 or the second power supply unit 250 is blocked. In an exemplary embodiment of the inventive concept, to improve the accuracy of the detection of the abnormality, the power supply may be blocked when the abnormality is detected for M successive detection periods DP. Hereinafter, this exemplary embodiment will be described in more detail with reference to FIG. 5.

Figure 5:
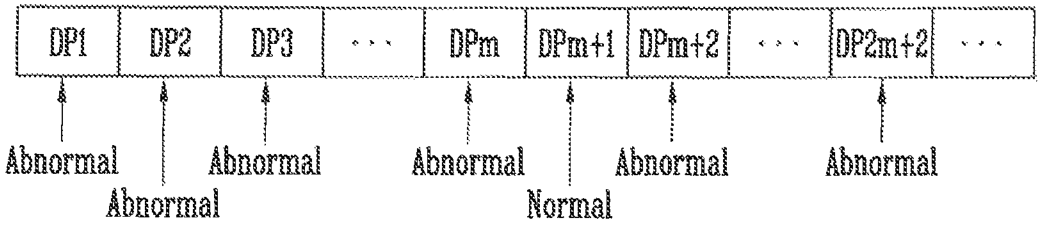
FIG. 5 is a drawing for showing another example of a method of detecting an abnormal control signal by the display device of FIG. 1 according to an exemplary embodiment of the inventive concept.

FIG. 5 is a drawing for showing another example of a method of detecting an abnormal control signal by the display device of FIG. 1. Each detection period DP is shown as being separated with each other in FIG. 5, but it may be easily understood that each detection period DP is overlapped at N−1 frames as described above.

In exemplary embodiments of the inventive concept, the detector 120 may finally determine the abnormality of the control signal CS when the abnormality is detected for M successive detection periods DP.

In an exemplary embodiment of FIG. 5, the control signal CS is detected to be abnormal for the first detection period DP1, which is formed of the first frame F1 to the N-th frame Fn. Likewise, the control signal CS is detected to be abnormal for the second detection period DP2, which is formed of the second frame F2 to the N+1-th frame Fn+1. Subsequently, when the control signal CS is detected to be abnormal for the third detection period DP3 to the M-th detection period DPm, the detector 120 may determine the state of the control signal CS to be abnormal and generate and output the abnormal detection signal DS in response thereto.

When the control signal CS is detected to be normal for the M+1-th detection period DPm 1, the detector 120 determines the state of the control signal CS to be normal. According to an exemplary embodiment, when the state of the control signal it determined to be normal, the detector 120 does not generate the abnormal detection signal DS or generates and outputs the abnormal detection signal DS indicating that the state of the control signal CS is normal.

In this embodiment, even though the control signal CS is detected to be abnormal for the M+2-th detection period DPm+2, the detector 120 does not determine the state of the control signal CS to be abnormal since the control signal CS is detected to be normal for the M+1-th detection period DPm+1. Hereinafter, if the control signal CS is detected to be abnormal for the M+3-th detection period DPm+3 to the 2M+2-th detection period DP2*m*+2, the detector 120 determines the control signal CS to be abnormal again.

Figure 6:
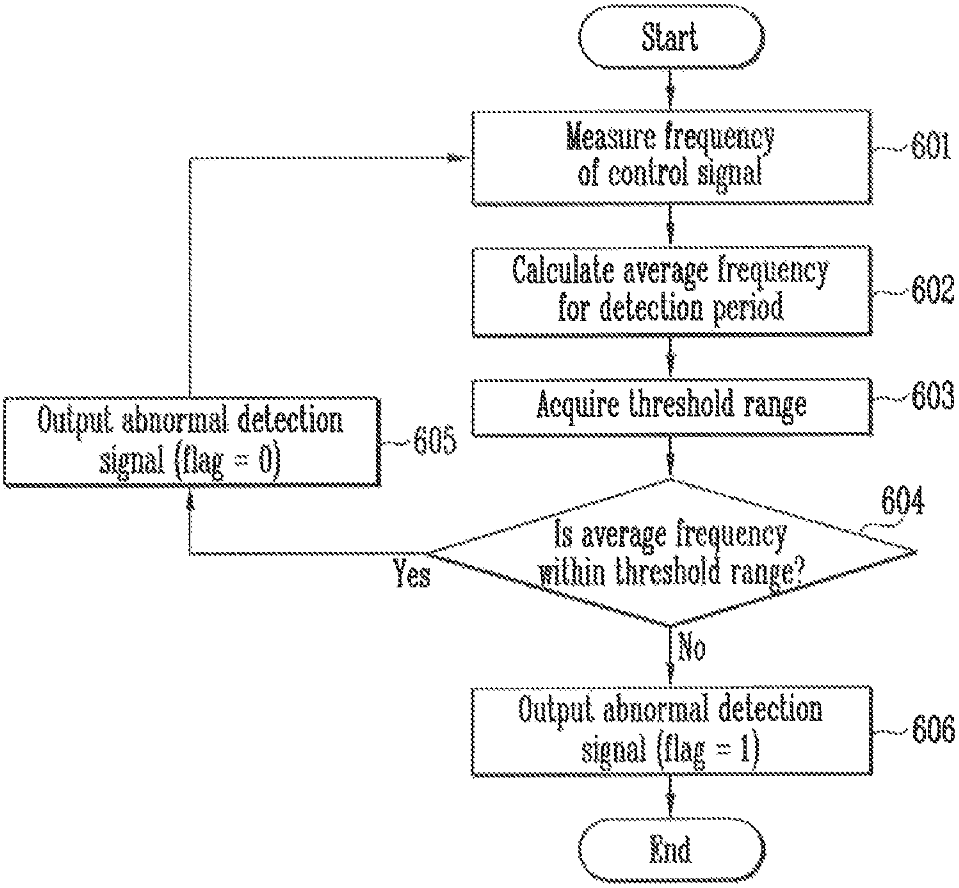
FIG. 6 is a flowchart for showing a driving method of a display device according to an exemplary embodiment of the inventive concept.

FIG. 6 is a flowchart for showing a driving method of a display device according to an exemplary embodiment of the inventive concept.

Referring to FIG. 6, first, the detector 120 measures the frequency of the control signal CS supplied from the processor 110 to the display unit 200 (601). In exemplary embodiments, the detector 120 may measure the frequency of the control signal CS in a frame unit (or frame period), and may measure the frequency during the emitting period within one frame (or one frame period). In an exemplary embodiment, the measured frequency is stored in a measuring value storage unit 122.

Next, the detector 120 calculates the average frequency for an arbitrary detection period formed of N successive frames from the measured frequencies of each frame (602).

In an exemplary embodiment, the detector 120 acquires the threshold range from the threshold range providing unit 124 (603). In exemplary embodiments of the inventive concept, the threshold range may be set to a fixed value or a variable value depending on the driving environment of the display device 1. When the threshold range is set to a fixed value, the predetermined threshold range may be stored directly in the detector 120, and the provision of the threshold range through the threshold range providing unit 124 may be omitted.

The detector 120 determines whether the calculated average frequency is within the threshold range (604).

If the average frequency is within the threshold range, the detector 120 determines that the state of the control signal CS is normal. If the control signal CS is determined to be normal, the detector 120 returns to the frequency measurement step (601) of the control signal CS to repeat the operation described above. In an exemplary embodiment, the detector 120 sets and outputs a flag value of the abnormal detection signal DS to zero (605), thereby informing the processor 110 or the timing controller 240 that the control signal CS is in a normal state.

On the other hand, if the average frequency is outside the threshold range, the detector 120 determines that the state of the control signal CS is abnormal. If the control signal CS is determined to be abnormal, the display device 1 outputs the abnormal detection signal DS to the processor 110 or the timing controller 240 to inform that the control signal CS is in an abnormal state. In an exemplary embodiment, when the control signal is determined to be abnormal, detector 120 sets and outputs the flag value of the abnormal detection signal DS to 1 (606).

In response to this abnormal detection signal DS, the processor 110 or the timing controller 240 blocks the power supply of the first power supply unit 130 or the second power supply unit 250. Accordingly, a power supply to the display panel 210 may be blocked.

In an exemplary embodiment of the inventive concept, the detector 120 directly outputs the power control signal PCS to the first power supply unit 130 or the second power supply unit 250 in response to the abnormal detection signal DS.

Figure 7:
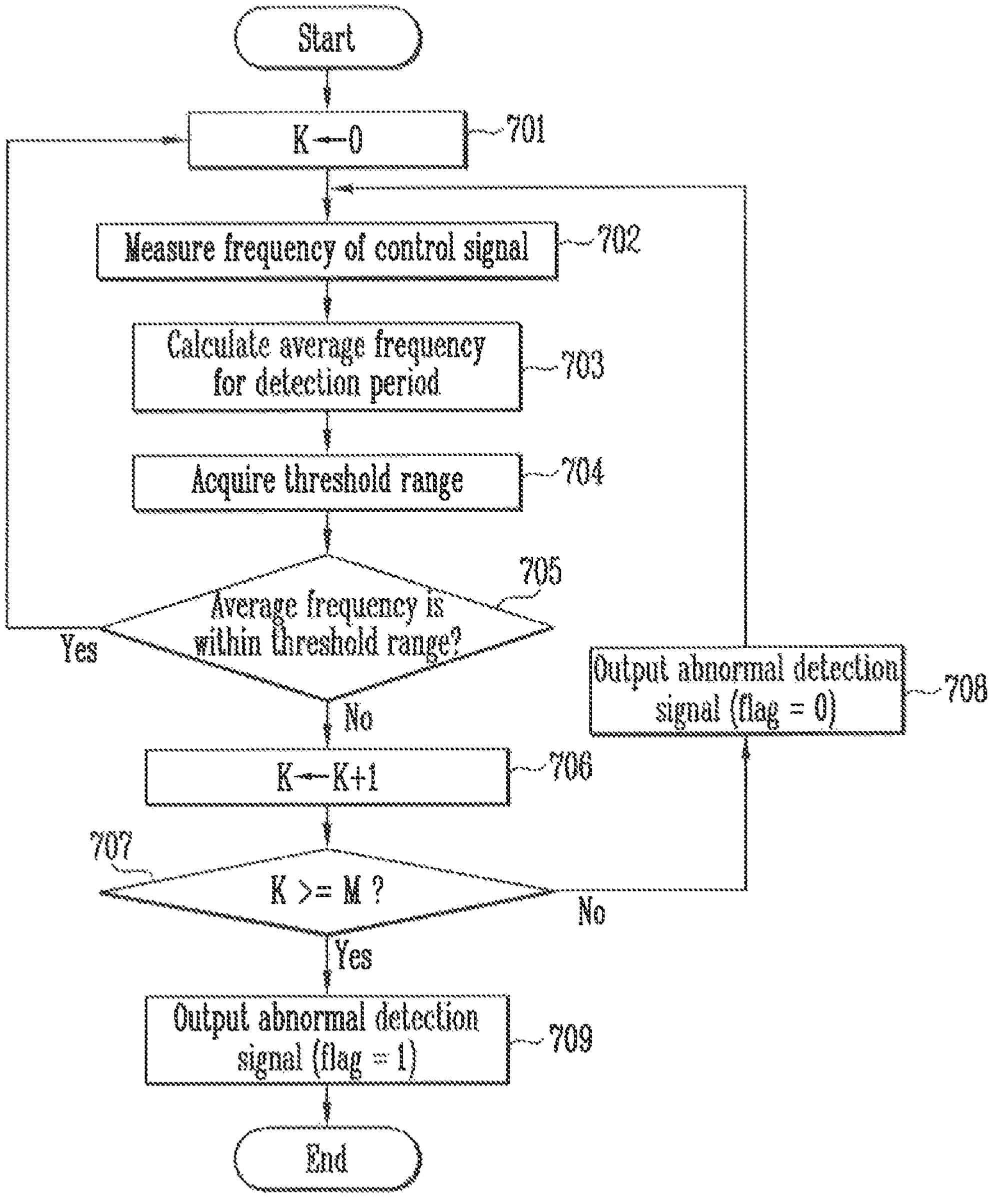
FIG. 7 is a flowchart for showing a driving method of a display device according to an exemplary embodiment of the inventive concept.

FIG. 7 is a flowchart for showing a driving method of a display device according to an exemplary embodiment of the inventive concept.

Referring to FIG. 7, the driving method of the display device according to an exemplary embodiment of the inventive concept may be performed after a variable K which indicates the number of the detection periods in which the abnormal control signal CS is detected is initialized to zero (701).

Hereinafter, the detector 120 measures the frequency of the control signal CS supplied from the processor 110 to the display unit 200 (702). In exemplary embodiments, the detector 120 measures the frequency of the control signal CS in a frame unit (or frame period), and may measure the frequency during the emitting period within one frame (or one frame period). In an exemplary embodiment, the measured frequency is stored in the measuring value storage unit 122.

Next, the detector 120 calculates the average frequency for an arbitrary detection period formed of N successive frames from the measured frequencies of each frame (703).

In an exemplary embodiment, the detector 120 acquires the threshold range from the threshold range providing unit 124 (704). In exemplary embodiments of the inventive concept, the threshold range may be set to a fixed value or a variable value depending on the driving environment of the display device 1. When the threshold range is set to a fixed value, the predetermined threshold range may be stored directly in the detector 120, and the provision of the threshold range through the threshold range providing unit 124 may be omitted.

The detector 120 determines whether the calculated average frequency is within the threshold range (705).

If the average frequency is within the threshold range, the detector 120 detects the control signal CS to be normal for the corresponding detection period. Then, the detector 120 returns to the setting step (701) of the variable K to repeat the operation described above.

On the other hand, if the average frequency is outside the threshold range, the detector 120 detects the control signal CS to be abnormal for the corresponding detection period. In this case, the detector 120 increases the variable K by 1 (706), and determines whether the variable K is greater than or equal to a predetermined M (707).

If the variable K is smaller than the predetermined M, the detector 120 finally determines that the current state of the control signal CS is normal, and returns to the frequency measurement step (702) to repeat the operation described above. In an exemplary embodiment, the detector 120 sets and outputs a flag value of the abnormal detection signal DS to zero (708), thereby informing the processor 110 or the timing controller 240 that the control signal CS is in a normal state.

On the other hand, if the variable K is greater than or equal to the predetermined M, the detector 120 determines that the current state of the control signal CS is abnormal. The detector 120 may output the abnormal detection signal DS to the processor 110 or the timing controller 240 to inform that the current state of the control signal CS is abnormal. In an exemplary embodiment, the detector 120 sets and outputs the flag value of the abnormal detection signal DS to 1 when K is greater than or equal to M to indicate the control signal CS is abnormal (709).

In response to this abnormal detection signal DS, the processor 110 or the timing controller 240 blocks the power supply of the first power supply unit 130 or the second power supply unit 250. Accordingly, a power supply to the display panel 210 may be blocked.

In exemplary embodiments of the inventive concept, the detector 120 directly outputs the power control signal PCS to the first power supply unit 130 or the second power supply unit 250 in response to the abnormal detection signal DS.

Figure 8:
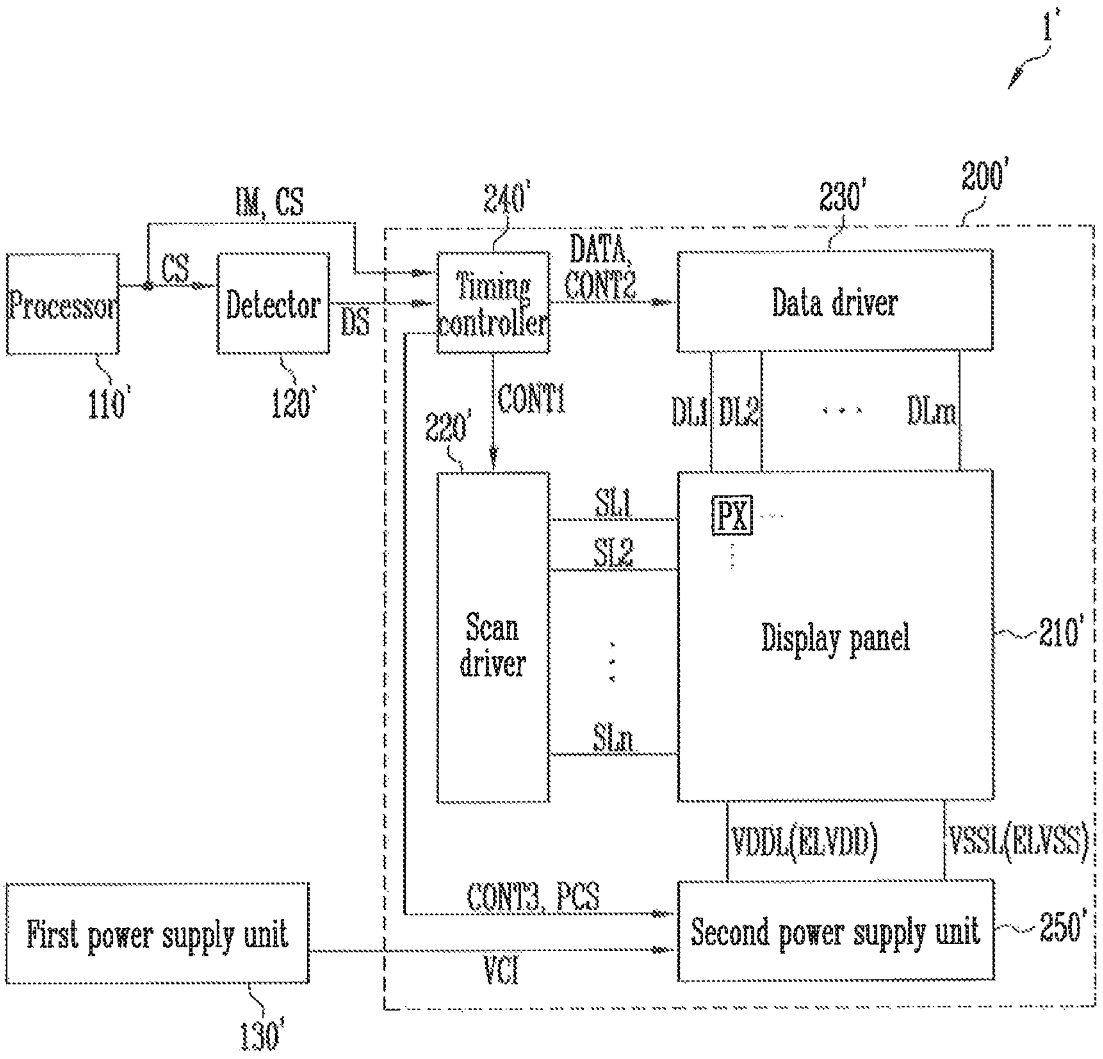
FIG. 8 is a block diagram for showing a display device according to an exemplary embodiment of the inventive concept.

FIG. 8 is a block diagram for showing a display device according to an exemplary embodiment of the inventive concept.

Referring to FIG. 8, the display device 1' according to the an exemplary embodiment of the inventive concept includes a processor 110', a detector 120', a first power supply unit 130' and a display unit 200'. Since the display device 1' according to an exemplary embodiment of the inventive concept is substantially the same as the display device 1 of FIG. 1 except that the detector 120' transmits the abnormal detection signal DS to the timing controller 240' instead of the processor 110', duplicate descriptions will be omitted for the same or similar constituent elements.

The detector 120' according to an exemplary embodiment of the inventive concept measures the frequency of the control signal CS output from the processor 110 and detects the abnormality of the control signal CS by comparing the measured frequency with the threshold range. In an exemplary embodiment, the detector 120' calculates the average frequency of the control signal CS for a detection period formed of N successive frames (or frame periods) and detects the abnormality of the control signal CS by comparing the calculated average frequency with the threshold range. In addition, the detector 120' may determine that the current state of the control signal CS is abnormal when an abnormality of the control signal CS is detected for M successive detection periods.

In an exemplary embodiment, if the current state of the control signal CS is determined to be abnormal, the detector 120' transmits the abnormal detection signal DS to the timing controller 240' to inform of the abnormal state of the control signal CS. The timing controller 240' disable the second power supply unit 250' in response to the abnormal detection signal DS indicating an abnormal control signal CS received from the detector 120', thereby blocking a power supply to the display unit 200. For example, the timing controller 240' may disable the second power supply unit 250' by supplying the power control signal PCS to the second power supply unit 250'. Here, the power control signal PCS may be a power supply disable signal (PW_SUPPLY_DISABLE) or a power protection enable signal (PW_PROTECTION_EN). The detector 120' may be implemented using the components shown in FIG. 3. In an exemplary embodiment, the timing controller 240' enables the second power supply unit 250' if it has already been disabled and the abnormal detection signal DS indicates the control signal CS is normal. For example, the timing controller 240' may output the power protection enable signal to enable a power supply unit.

Figure 9:
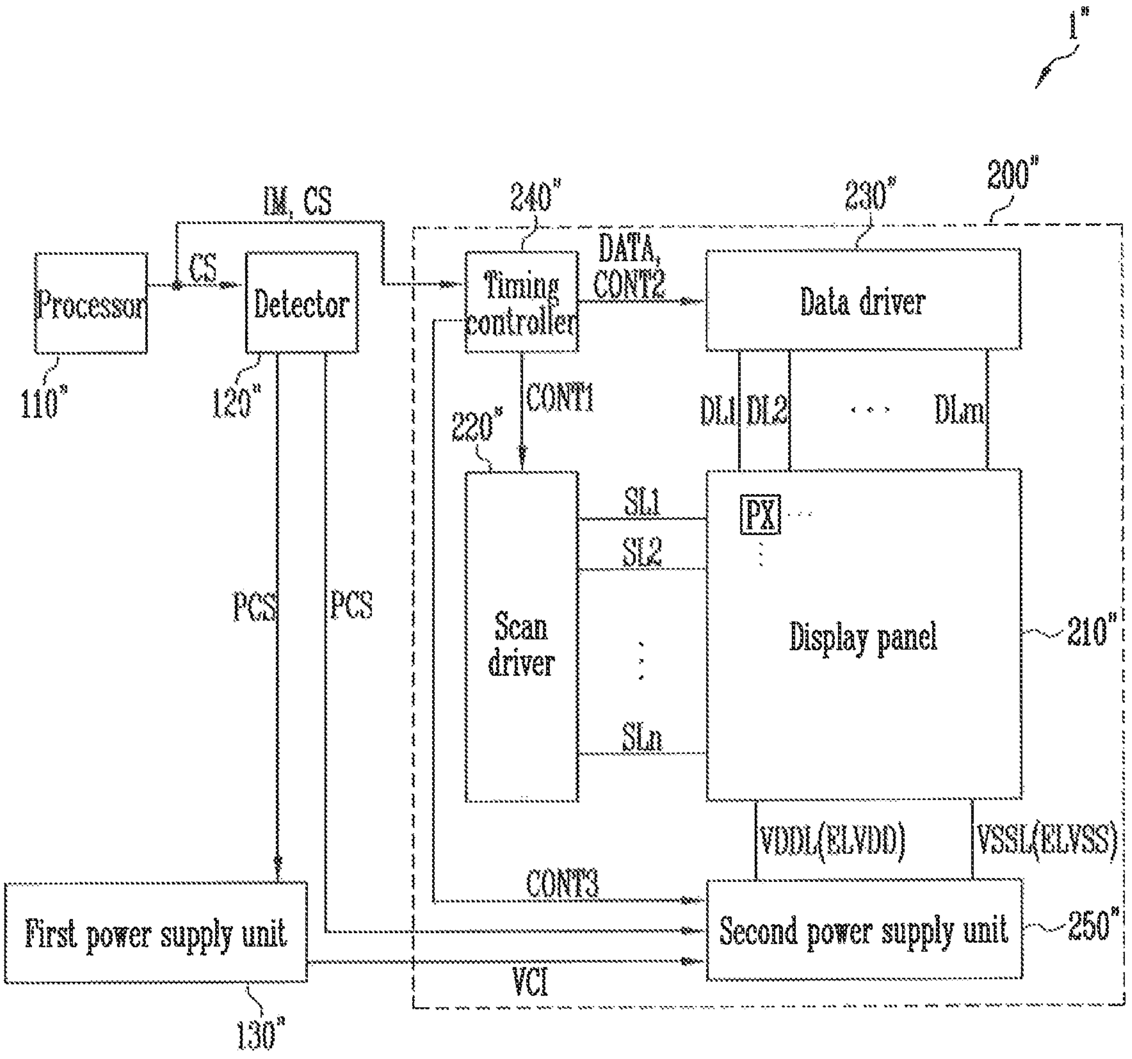
FIG. 9 is a block diagram for showing a display device according to an exemplary embodiment of the inventive concept.

FIG. 9 is a block diagram for showing a display device according to an exemplary embodiment of the inventive concept.

Referring to FIG. 9, a display device 1" according to an exemplary embodiment of the inventive concept includes a processor 110", a detector 120", a first power supply unit 130" and a display unit 200". Since the display device 1" according to an exemplary embodiment of the inventive concept is substantially the same as the display device 1 of FIG. 1 except that the detector 120" directly generates a power control signal PCS and transmits the power control signal PCS to the first power supply unit 130' or the second power supply unit 250', duplicate descriptions will be omitted for the same or similar constituent elements.

The detector 120" according to an exemplary embodiment of the inventive concept measures the frequency of the control signal CS output from the processor 110" and detects the abnormality of the control signal CS by comparing the measured frequency with the threshold range. In an exemplary embodiment, the detector 120" may calculate the average frequency of the control signal CS for a detection period formed of N successive frames and detect the abnormality of the control signal CS by comparing the calculated average frequency with the threshold range. In addition, the detector 120" may determine that the current state of the control signal CS is abnormal when an abnormality of the control signal CS is detected for M successive detection periods.

If the current state of the control signal CS is determined to be abnormal, the detector 120" may transmit a power control signal PCS to the first power supply unit 130" or the second power supply unit 250" to disable the first power supply unit 130" or the second power supply unit 250". Here, the power control signal PCS may be a power supply disable signal (PW_SUPPLY_DISABLE) or a power protection enable signal (PW_PROTECTION_EN). When the first power supply unit 130" or the second power supply unit 250" is disabled, a power supply to the display unit 200 may be blocked.

In this exemplary embodiment, the detector 120" may also transmit the abnormal detection signal DS to the processor 110 or the timing controller 240" to inform an abnormal state of the control signal CS. The detector 120" may be implemented using the components shown in FIG. 3. In an exemplary embodiment, if one of the first power supply unit 130" and the second power supply unit 250" have been disabled, and the control signal CS is determined to be normal, the detector 120" enables the disabled power supply unit. For example, the detector 120" may output the power protection enable signal to the disabled power supply unit to enable it.

Figure 10:
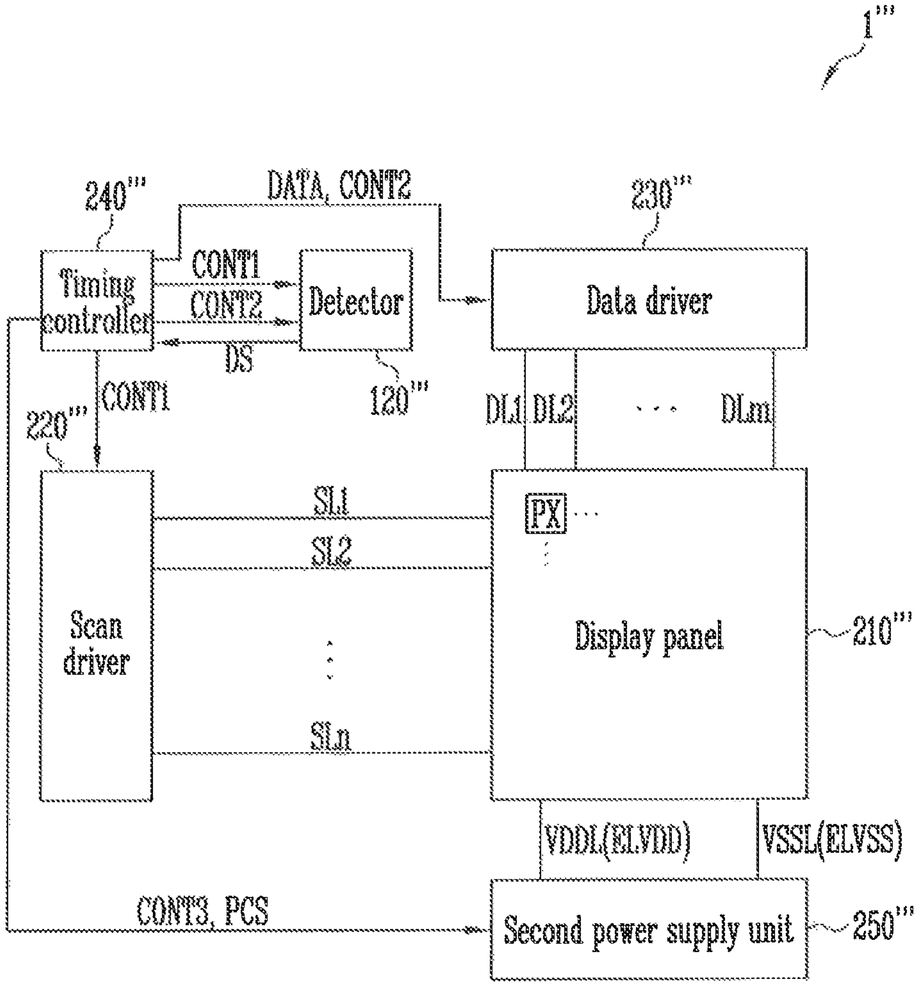
FIG. 10 is a block diagram for showing a display device according to an exemplary embodiment of the inventive concept.

FIG. 10 is a block diagram for showing a display device according to an exemplary embodiment of the inventive concept.

Referring to FIG. 10, the display device 1''' according to an exemplary embodiment of the inventive concept includes a detector 120''', a display panel 210''', a scan driver 220''', a data driver 230''', a timing controller 240''', and a second power supply unit 250'''. Since the display device 1''' according to the fourth exemplary embodiment of the inventive concept is substantially the same as the display device 1 of FIG. 1 except that the detector 120''' detects an abnormality of the driving control signals CONT1 and CONT2 output from the timing controller 240''', duplicate descriptions will be omitted for the same or similar constituent elements.

The detector 120''' according to an exemplary embodiment of the inventive concept measures the frequency of the driving control signals CONT1 and CONT2 output from the timing controller 240''' and detects an abnormality of the driving control signals CONT1 and CONT2 by comparing the measured frequency with the threshold range. The driving control signals CONT1 and CONT2 output from the timing controller 240''' may include a first driving control signal CONT1 for controlling the driving timing of the scan driver 220''' and a second driving control signal CONT2 for controlling the driving timing of the data driver 230'''. Here, the first driving control signal CONT1 may include a start signal or a clock signal used to shift the start signal. The second driving control signal CONT2 may include a source start signal, a source output enable signal, or a source sampling clock signal.

In an exemplary embodiment, the detector 120''' calculates the average frequency of the driving control signals CONT1 and CONT2 for a detection period formed of N successive frames and detects an abnormality of the driving control signals CONT1 and CONT2 by comparing the calculated average frequency with the threshold range. In addition, when the abnormality of the driving control signals CONT1 and CONT2 is detected for M successive detection periods, the detector 120''' may finally detect that the current state of the driving control signals CONT1 and CONT2 is abnormal.

In an exemplary embodiment, if the current state of the driving control signals CONT1 and CONT2 is determined to be abnormal, the detector 120''' transmits the abnormal detection signal DS to the timing controller 240''' to inform of the abnormal state of the driving control signals CONT1 and CONT2. In an exemplary embodiment, the timing controller 240''' disables the second power supply 250''' in response to the abnormal detection signal DS received from the detector 120''' indicating that both the driving control signals CONT1 and CONT2 are abnormal, thereby blocking the power supply to the display panel 210'''. For example, the timing controller 240''' may disable the second power supply unit 250''' by providing the power control signal PCS to the second power supply unit 250'''. Here, the power control signal PCS may be a power supply disable signal (PW_SUPPLY_DISABLE) or a power protection enable signal (PW_PROTECTION_EN).

In an exemplary embodiment of the inventive concept, when an abnormality of the driving control signals CONT1 and CONT2 is determined, the detector 120''' directly disables the second power supply unit 250'''. In this exemplary embodiment, the detector 120''' disables the second power supply unit 250''' by providing the power control signal PCS to the second power supply unit 250'''. However, even in this exemplary embodiment, the detector 120''' may transmit an abnormal detection signal DS to the timing controller 240''' to inform of an abnormal state of the driving control signals CONT1 and CONT2.

In an exemplary embodiment, if the current state of the first driving control signal CONT1 or the second driving control signal CONT2 is determined to be abnormal, the detector 120''' transmits the abnormal detection signal DS to the timing controller 240''' to inform of the abnormal state of a driving control signal. In an exemplary embodiment, the timing controller 240''' disables the second power supply 250''' in response to the abnormal detection signal DS received from the detector 120''' indicating that one or more of the driving control signals CONT1 and CONT2 are abnormal, thereby blocking the power supply to the display panel 210'''. For example, the timing controller 240''' may disable the second power supply unit 250''' by providing the power control signal PCS to the second power supply unit 250'''. Here, the power control signal PCS may be a power supply disable signal (PW_SUPPLY_DISABLE) or a power protection enable signal (PW_PROTECTION_EN).

In an exemplary embodiment of the inventive concept, when an abnormality one or more of the driving control signals CONT1 and CONT2 is determined, the detector 120''' directly disables the second power supply unit 250'''. In this exemplary embodiment, the detector 120''' disables the second power supply unit 250''' by providing the power control signal PCS to the second power supply unit 250'''. However, even in this exemplary embodiment, the detector 120''' may transmit an abnormal detection signal DS to the timing controller 240''' to inform of an abnormal state of one or more the driving control signals CONT1 and CONT2.

In an exemplary embodiment, if the second power supply unit 250''' has already been disabled and both the driving control signals CONT1 and CONT2 are determined to be normal, the detector 120''' enables the second power supply unit 250'''. For example, the detector 120''' may output a power protection enable signal to enable the second power supply unit 250'''.

While the inventive concept has been shown and described with reference to exemplary embodiments thereof, those of ordinary skill in the art will readily appreciate that modifications in form and details may be made thereto without materially departing from spirit and scope of the inventive concept.

What is claimed is:

1. A display device comprising:

a display unit configured to display an image;

a processor that supplies a control signal for controlling a driving of the display unit;

a detection circuit that detects whether the control signal is abnormal based on a frequency of the control signal measured in a frame unit; and a power supply that supplies driving power to the display unit, where the driving power is blocked from being supplied to the display unit when the control signal is detected to be abnormal, wherein the detection circuit detects whether the control signal is abnormal based on an average frequency of the control signal for N successive frames, where N is a natural number of 2 or more.

2. The display device of claim 1, wherein the detection circuit calculates the average frequency for a detection period formed of the N successive frames and detects the control signal to be abnormal for the detection period when the average frequency is outside a predetermined threshold range.

3. The display device of claim 2, wherein the detection circuit determines the control signal to be in an abnormal state when the control signal is detected to be abnormal for M successive detection periods, where M is a natural number of 2 or more.

4. The display device of claim 3, wherein the detection circuit outputs an abnormal detection signal when the control signal is detected to be abnormal.

5. The display device of claim 4, wherein the detection circuit outputs the abnormal detection signal to the processor or the display unit, and the processor or the display unit disables the power supply in response to the abnormal detection signal.

6. The display device of claim 4, wherein the detection circuit disables the power supply when the control signal is detected to be abnormal.

7. The display device of claim 2, wherein the threshold range is set between a first threshold value obtained by subtracting an offset value from a reference value of the frequency and a second threshold value obtained by adding the offset value to the reference value.

8. The display device of claim 7, wherein the threshold range is set to a fixed value or a variable value depending on a driving environment of the display device.

9. The display device of claim 7, wherein the offset value is set based on a maximum allowable variation of the frequency or a variation of the frequency that can occur under a maximum load condition.

10. The display device of claim 7, wherein the reference value is set to vary based on a maximum value or minimum value of the frequency measured before the control signal is detected to be abnormal.

11. The display device of claim 1, wherein the power supply includes a first power supply that converts alternating current (AC) power supplied from an external source into direct current (DC) power and outputs the DC power; and a second power supply that generates the driving power from the DC power output from the first power supply and supplies the driving power to the display unit, wherein at least one of the first power supply and the second power supply is disabled when the control signal is detected to be abnormal.

12. A driving method of a display device comprising:

supplying, by a power supply, driving power to a display unit for displaying an image;

measuring, by a detection circuit, a frequency of a control signal in a frame unit, the control signal for controlling a driving of the display unit;

calculating, by the detection circuit, an average frequency of the control signal for a detection period formed of N successive frames, where N is a natural number of 2 or more;

detecting, by the detection circuit, whether the control signal is abnormal based on the average frequency; and blocking the supply of the driving power to the display unit when the control signal is detected to be abnormal.

13. The driving method of claim 12, wherein the detecting whether the control signal is abnormal comprises:

determining whether the average frequency is within a predetermined threshold range; and detecting the control signal to be abnormal for the detection period when the average frequency is outside a threshold range.

14. The driving method of claim 13, wherein the detecting whether the control signal is abnormal further includes determining the control signal to be in an abnormal state when the control signal is detected to be abnormal for M successive detection periods, where M is a natural number of 2 or more.

15. The driving method of claim 13, further comprising setting the threshold range before the detecting whether the control signal is abnormal.

16. The driving method of claim 15, wherein the setting the threshold range comprises:

calculating a first threshold value obtained by subtracting an offset value from a reference value of the frequency and a second threshold value obtained by adding the offset value to the reference value; and setting the threshold range between the first threshold value and the second threshold value.

17. The driving method of claim 16, wherein the setting the threshold range comprises:

changing at least one of the reference value and the offset value corresponding to a driving environment of the display device; and resetting the threshold range based on at least one of the changed reference value and the changed offset value.

18. The driving method of claim 17, wherein the changing at least one of the reference value and the offset value includes varying the reference value based on a maximum value or minimum value of the frequency measured before the control signal is detected to be abnormal.

19. The driving method of claim 16, wherein the offset value is set based on a maximum allowable variation of the frequency or a variation of the frequency that can occur under a maximum load condition.

20. The driving method of claim 12, further comprising outputting an abnormal detection signal after the detecting detects the control signal is abnormal.

21. The driving method of claim 12, wherein the blocking supply of the driving power to the display unit includes disabling at least one of a first power supply and a second power supply, and wherein the first power supply converts an alternating current (AC) power supplied from an external source into a direction current (DC) power and outputs the DC power, and the second power supply generates the driving power from the DC power output from the first power supply and supplies the driving power to the display unit.

22. A display device comprising:

a display panel that includes at least one pixel, the display panel configured to display an image;

a timing controller that supplies a driving control signal for controlling a driving of the display panel;

a detection circuit that detects whether the driving control signal is abnormal based on a frequency of the driving control signal measured in a frame unit; and a power supply that supplies driving power to the display panel, where the driving power is blocked from being supplied to the display panel in when the driving control signal is detected to be abnormal, wherein the detection circuit detects whether the driving control signal is abnormal based on an average frequency of the control signal for N successive frames, where N is a natural number of 2 or more.

23. The display device of claim 22, wherein the detection circuit calculates the average frequency for a detection period formed of the N successive frames and detects the driving control signal to be abnormal for the detection period when the average frequency is outside a predetermined threshold range.

24. The display device of claim 23, wherein the detection circuit determines the driving control signal to be in an abnormal state when the driving control signal is detected to be abnormal for M successive detection periods, where M is a natural number of 2 or more.

* * * * *